Oct. 26, 1971    TAISUKE KANEKO ET AL    3,614,866
POLYPOD STRUCTURE FOR CIVIL ENGINEERING USES
Filed April 1, 1969

United States Patent Office 3,614,866
Patented Oct. 26, 1971

3,614,866
POLYPOD STRUCTURE FOR CIVIL ENGINEERING USES
Taisuke Kaneko, Ehime-ken, and Fumiyasu Morioka, Sapporo-shi, Hokkaido, Japan, assignors to Kyowa Concrete Kogyo Kabushiki Kaisha Sapporo-shi, Hokkaido, Japan
Filed Apr. 1, 1969, Ser. No. 811,983
Claims priority, application Japan, Feb. 21, 1969 (utility model), 44/15,388
Int. Cl. E02b 3/04, 3/12, 3/14
U.S. Cl. 61—3
8 Claims

ABSTRACT OF THE DISCLOSURE

A polypod block is composed of at least three pillar-shaped parts integrally joined with alternately crossed relationship, the block thereby having at least six legs, and the dimensions and shape of the block are so selected that a large number of these blocks can be interlocked in several ways to form tightly assembled combinations of the blocks for purposes such as wave breaking, soil erosion control, and dissipation of the energy of flowing water.

BACKGROUND OF THE INVENTION

This invention relates to block-like structures and materials for civil engineering uses and more particularly to concrete block-like structures suitable for use in work such as that related to river and canal engineering, erosion control, embankment and levee construction, and construction for protection of sea coasts, harbors, and lakeshores.

While a large variety of block-like structures (hereinafter referred to as "blocks") of the instant kind have heretofore been proposed and made, there has never been blocks of a type which is entirely satisfactory, particularly in the mutual locking and stability between blocks. For example, among known blocks for wave breaking, very few are designed to interlock or engage securely with each other, and even these blocks which can engage with each other are easily disengaged by wave action.

When dumped or heaped at random, conventional blocks are easily toppled or overturned by waves, whereby they cannot function effectively as wave dissipation means. Furthermore, known blocks, in general, have had geometrically irregular shapes and have entailed high production costs, and the modes of their combinations have also been limited.

SUMMARY OF THE INVENTION

In view of the above described circumstances, it is an object of the present invention to provide blocks for civil engineering uses of a character such that a plurality thereof can easily be combined in secure mutual engagement and, moreover, can be thus combined with various modes of engagement.

Another object of the invention is to provide blocks for civil engineering uses which have geometrically simple configurations and, therefore, can be easily produced at low cost.

Still another object of the invention is to provide blocks for civil engineering uses which, when caused to engage with each other, form strong assembled structures which cannot be easily disassembled or damaged by applications of external forces.

A further object of the invention is to provide blocks of the above stated character which can be caused to engage with each other in accordance with various modes of engagement whereby the perviousness of the resulting combined structure can be selectively adjusted.

The foregoing objects, as well as other objects and advantageous features of the invention as will presently become apparent, have been achieved by the present invention in accordance with which, briefly summarised, there is provided a polypod structure (block) for civil engineering uses comprising, in integral combination, at least three pillar-shaped members integrally joined with alternately crossed relationship.

The nature, details, and utility of the invention will be more clearly apparent from the following detailed description with respect to preferred embodiments of the invention when read in conjunction with the accompanying drawings, in which like parts are designated by like reference numerals.

DETAILED DESCRIPTION

Figure 1:
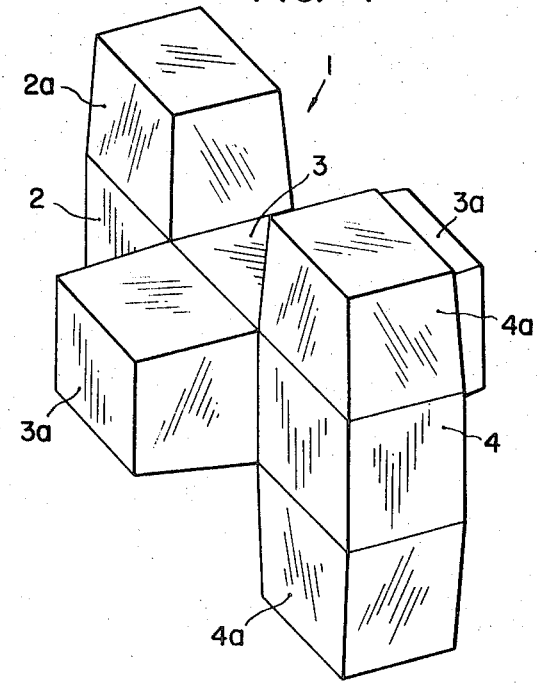
FIG. 1 is a perspective view showing one example of a block according to the invention.
Figure 2:
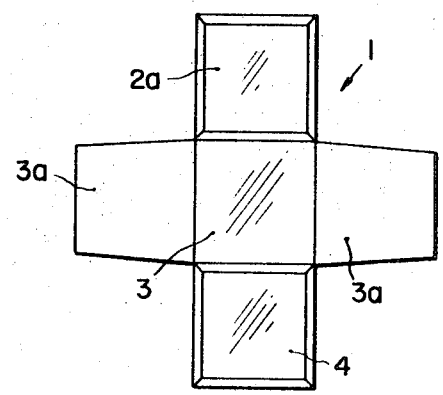
FIG. 2 is a plan view of the block shown in FIG. 1 as viewed from above.
Figure 3:
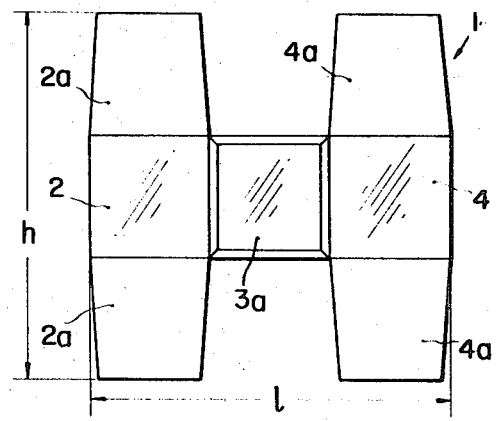
FIG. 3 is a side elevation of the block as viewed from the left in FIG. 2.

Referring first to FIGS. 1, 2, and 3, the block illustrated and generally designated by reference numeral 1 therein is basically composed of three pillar-shaped members 2, 3, and 4. As indicated best in FIG. 1, the two outer side pillar members 2 and 4 extend in the same direction in substantially mutually parallel and spaced apart relationship, while the intermediate or middle pillar member 3 interposed between pillar members 2 and 4 extends substantially perpendicularly to outer pillar members 2 and 4 in crossed relationship thereto.

These three pillar-shaped members are substantially identical in shape and dimensions, and have substantially rectangular cross-sections, although their cross section in some cases may be circular, elliptical, polygonal, or some other suitable shape.

Each of these pillar members has a middle part and two end extension parts. For example, member 2 has a middle part 2 between two extension parts 2a, 2a. Thus, the block 1 in this example is a hexapod block having six extension parts or legs 2a, 2a; 3a, 3a; and 4a, 4a.

Each of the end extension parts or legs 2a, 3a, and 4a of the three pillar members in the illustrated example is slightly tapered convergently toward its extreme outer end, which shape of the extension part is preferable for practical use. It should be understood, however, that such a taper is not necessarily a requisite feature in all cases. When the overall dimensions $h$ and $l$ as indicated in FIG. 2 are made equal, great advantage is afforded for combining a plurality of blocks in mutually engaged relationship.

In the fabrication of block 1, the pillar members 2, 3, and 4 may be formed individually beforehand and then secured together by bonding with an adhesive, or they may be molded integrally from the beginning. While the former method requires two steps, the production cost is lower since a large number of pillar-shaped members of identical shape and size are first prepared and then merely bonded together.

Blocks 1 are suitable for use as wave breaking means and as means for dissipating or reducing the kinetic energy of water flow for protection of harbors, sea coasts, and lakeshores and of embankments and levees of rivers, streams, and canals. Furthermore, these blocks are suitable for use as means for consolidating and reinforcing bases of levees and beds in river engineering and erosion control. In applying these blocks for these various uses, a large number of these blocks are dumped at random or are combined according to any of various modes of engagement as described hereinafter, depending on the use.

Figure 4:
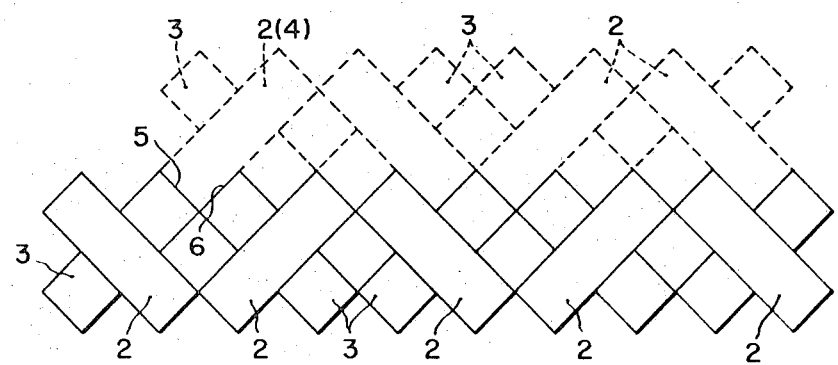
FIG. 4 is an elevation indicating a first example of combination of a plurality of blocks each as shown in FIGS. 1, 2, and 3.

In one example of combination of these blocks as indicated in FIG. 4, the blocks 1 are laid contiguously in a horizontal row with two adjacent pillar members, e.g., 2 and 3, of each block orientated to form a letter X relative to the horizontal direction, all members 2 lying in a single first vertical plane, and all members 3 lying in another vertical plane parallel to the first vertical plane. The members 2 of adjacent blocks 1 contact and are perpendicular to each other, while members 3 of adjacent blocks have a similar mutual relationship, whereby the members (2, for example) in each vertical plane describe a saw-tooth or zigzag pattern.

When the thickness (height) of the block layer is to be increased, an upper block layer as indicated by intermittent lines in FIG. 4 of an organization similar to that of the first block layer described above is laid on the lower first block layer.

The upper block layer is so laid that the diagonally downwardly facing end surface of each pillar member in one plane, e.g., member 2 or 4, in the upper block layer abuts against and is supported with surface contact by the diagonally upwardly facing end surface of a member 3 in the lower block layer, as illustrated by contact plane 5 in FIG. 4. Furthermore, the lower side surface of each pillar member, e.g., 2 or 4, in the upper block layer is supported with surface contact by the diagonally upwardly facing end surface of a pillar member 3 in the lower block layer as illustrated by plane 6 in FIG. 4. Consequently, the upper block layer row is supported in a stable state relative to the lower block layer row.

By this combination arrangement, transverse through spaces are formed between the blocks, whereby each block row possesses a pervious characteristic or the characteristic of permitting passage therethrough of fluids. This characteristic is useful in preventing, for example, wash erosion or excavation by reducing the kinetic energy of flowing water.

Figure 5:
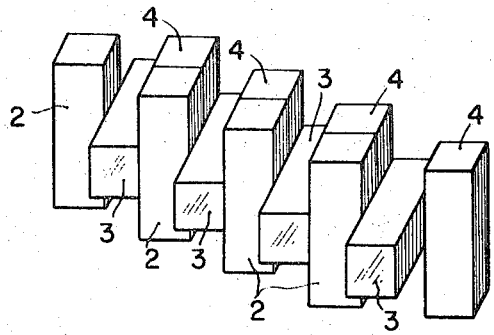
FIG. 5 is a perspective view indicating another example of combination of the same blocks.

In another example of combination of blocks 1 as illustrated in FIG. 5, the blocks 1 are laid with their parallel pillar members 2 and 4 in vertical orientation, the pillar members 3 thereby being disposed horizontally. The blocks are arranged in a horizontal staggered or cascade row in which a vertical pillar member, e.g., member 4, of one block is in surface contact along one vertical side surface thereof with a confronting vertical side surface of a vertical pillar member, e.g., member 2 of an adjacent block as shown in FIG. 5.

By this arrangement, the outer side surfaces of the pillar members 2 and 4 of one block are respectively in contact with and supported by the side surfaces of the pillar members 3 of the adjacent blocks. Accordingly, the engagement between the blocks is stable. By this arrangement, furthermore, since the projected cross sectional area of through spaces in the transverse direction between blocks is not as large as that in the block arrangement illustrated in FIG. 4, the block combination has a semipervious characteristic.

A block combination of semipervious characteristic can be used in combination with a pervious block combination for dissipating the energy of flowing water or used by itself as a barrier for checking erosion. It is also possible, of course, to lay the block row as shown in FIG. 5 as a lower layer and to lay thereupon another row of blocks as an upper layer by a suitable mode of combination.

Figure 6:
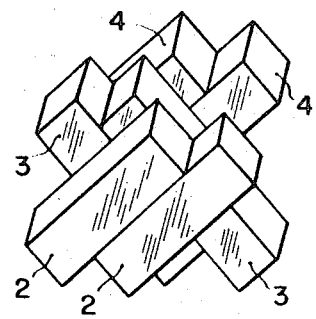
FIG. 6 is a perspective view indicating still another example of combination of the same blocks.

In still another example of combination of blocks 1 as illustrated in FIG. 6, each block is orientated to form a letter X relative to the horizontal direction as in the above described first example of combination. In the instant example, however, the spaces between the legs of pillar members 2 and 4 of each block respectively receive the legs of the middle pillar members 3 of the adjacent blocks. Accordingly, the middle pillar members 3 are leaning diagonally on and against successive members 3, all members 3 in each row of blocks being parallel to each other and lying in a single vertical plane.

While only two blocks are shown in FIG. 6 for the sake of clarity of description, it can be observed therefrom that the upper leg of the middle pillar member 3 of the right-hand block is fitted in between the upper legs of the outer pillar members 2 and 4 of the adjacent left-hand block. Accordingly, the two blocks are in a state and mutual relationship of firm engagement.

Since the through spaces in the transverse direction in this example of block combination are very small, the combined structure exhibits an impervious characteristic, which is highly useful for purposes such as preventing erosion of river embankments and levees. In this example combination, also it is possible, of course, to lay another block row on the block row indicated in FIG. 6.

In addition to the above described examples of modes of block combination, various other modes of block engagement and combination are possible and practically useful through the use of blocks 1 each as shown in FIGS. 1, 2, and 3. Because of the unique shape of these blocks 1, they can be easily combined in a wide variety of mutual engagements and, moreover, cannot be easily disengaged once they are mutually engaged. A further advantageous feature of this block is that the degree of perviousness of a block row can be readily adjusted by suitably selecting the mode of block assembly, as described above.

Figure 7:
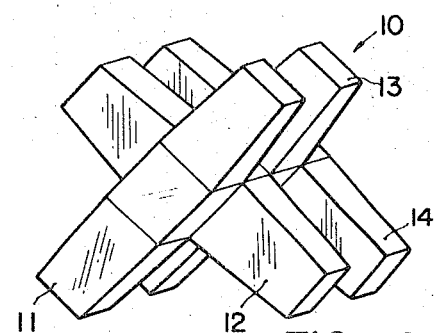
FIG. 7 is a perspective view illustrating a second example of a block embodying the invention.

In another embodiment of the invention as illustrated in FIG. 7, the block, which is generally designated by reference numeral 10, is basically the same as that of the block 1 described above but is provided with an additional pillar member disposed on the outer side of and perpendicular to a member corresponding to outer member 2 or 4 of the block 1 and spaced apart by this member from a member corresponding to member 3 of the block 1. That is, block 10 is composed of four pillar members 11, 12, 13 and 14 with alternately crossed relationship, members 11 and 13 being parallel to each other and perpendicular to members 12 and 14, and members 12 and 13 being interposed respectively between members 11 and 13 and between members 12 and 14.

The cross-sectional shape of each pillar member can be selected to suit the use similarly as in the block 1 described with reference to FIGS. 1 through 6.

Figure 8:
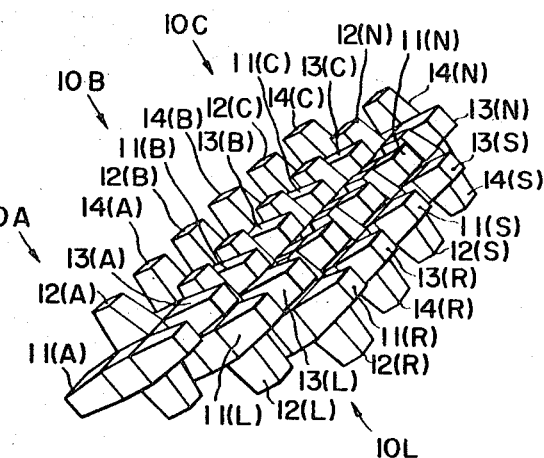
FIG. 8 is a perspective view indicating one example of combination of a plurality of blocks each as shown in FIG. 7.

In one example of combination of several blocks 10 as illustrated in FIG. 8, the blocks are combined in the following manner. First, blocks 10A, 10B, 10C, . . . are alined in a row in the transverse direction (from left foreground to right background as viewed in FIG. 8). Next, the downwardly extending leg of the pillar member 11 of a block 10L of the adjacent block row to the right of the first row is fitted into the space between the downwardly extending legs of pillar members 12 and 14 of block 10A.

Accordingly, the upwardly projecting leg of member 12 of block 10L is fitted into the space between the upwardly projecting legs of member 13 of block 10A and member 11 of block 10B, and the downwardly extending leg of member 13 of block 10L is fitted into the space between the downwardly projecting legs of member 14 of block 10A and member 12 of block 10B. Furhermore, the upwardly extending leg of member 14 of block 10L is fitted into the space between the upwardly projecting legs of members 11 and 13 of block 10B. As a result, blocks 10A and 10B are coupled together by block 10L.

Figure 9:
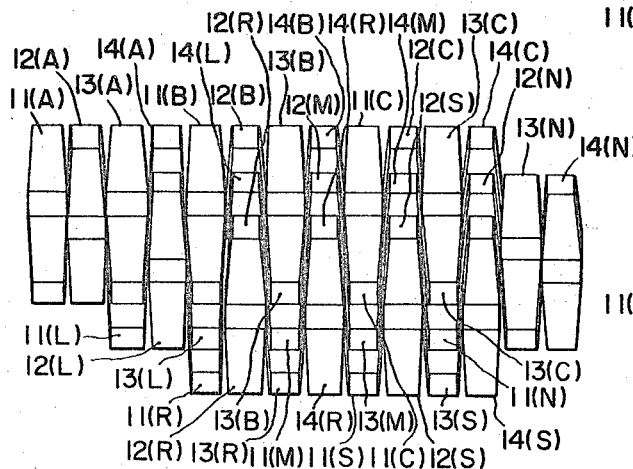
FIG. 9 is a top view of the block combination shown in FIG. 8.

Thus, successive blocks 10L, 10M, 10N, . . . and blocks 10R, 10S, . . . are similarly coupled, whereupon a coupled block structure as indicated in FIGS. 8 and 9 is formed.

A feature of the block 10 shown in FIG. 7 is that, since it is provided with four pillar members, adjacent blocks 10 alined in a first row are mutually and securely coupled together in the direction of the row by intermeshing blocks in a second row. This kind of coupling cannot be attained by a block as illustrated in FIG. 1 having three pillar members.

Figure 10:
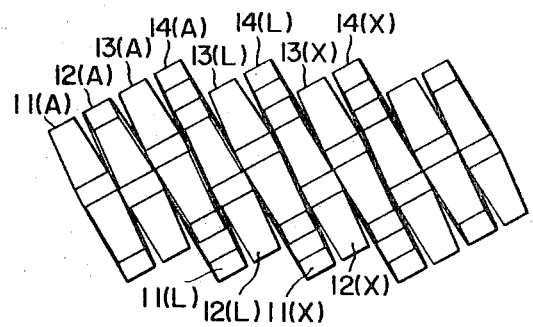
FIG. 10 is a plan view indicating another example of combination of blocks each as shown in FIG. 7.

In another mode of combination of blocks 10 as illustrated in FIG. 10, the downwardly extending leg of member 11 of block 10L is fitted into the space between the downwardly extending legs of members 12 and 14 of block 10A, and the downwardly projecting leg of member 11 of block 10R is fitted into the space between the downwardly projecting legs of members 12 and 14 of block 10L, whereby coupling of the blocks into a unitary structure of diagonally orientated blocks is accomplished.

By the use of blocks 10 as shown in FIG. 7 which can be securely coupled as described above, the blocks in a coupled block structure cannot readily be separated from each other, and the structure, without being disintegrated even when subjected to repeated external forces, retains its original state at the time of installation for a long period which may be considered to be permanent for practical purposes. Accordingly, this block 10 is highly suitable for use as a wave breaking block.

When blocks 10 are combined in the above described manner, as indicated with particular clearness in FIG. 8, a large number of cavities and projections are formed on the upper part of the resulting coupled block structure. At the same time, a large number of voids are formed by the concavities and convexities at the lower part of the structure. Accordingly, such a coupled block structure is highly and consistently effective for wave breaking since these numerous concavities and convexities function to cause waves to collide against the structure in various directions and thereby to be dissipated.

Figure 11:
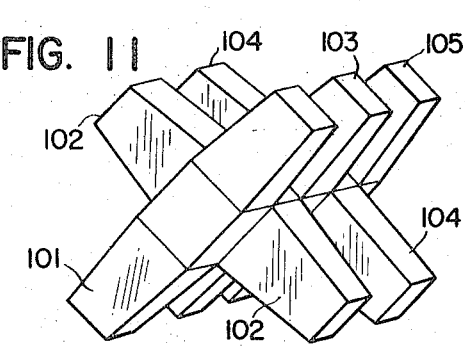
FIG. 11 is a perspective view illustrating a third example of a block embodying the invention.

In a further embodiment of the invention as illustrated in FIG. 11, the block is composed of five alternately crossing pillar members 101, 102, 103, 104, and 105. Since this block is provided with five pillar members, or one member more than the block illustrated in FIG. 7, it has ten legs, whereby coupling of even greater firmness between blocks can be attained when these blocks are coupled into a coupled block combination.

It should be understood, of course, that the foregoing disclosure relates to only preferred embodiments of the invention and that it is intended to cover all changes and modifications of the examples of the invention, which do not constitute departures of the spirit and scope of the invention. For example, while the invention has been described with respect to examples of blocks having three, four, and five pillar members and, therefore, six, eight, and ten legs, it will be apparent that a block according to the invention can be provided with six or more pillar members.

Furthermore, while the invention has been described above with respect to the examples of blocks in which the pillar-shaped members are joined together with crossed relationship at their middle parts, the present invention is intended to cover blocks in which the pillar members are joined together at parts thereof other than their middle parts.

We claim:

1. A polypod structure for civil engineering uses, comprising structural means having first, second and third elongated pillar-shaped members joined together integrally, wherein the longitudinal axes of said members are disposed in spaced parallel planes, said first member and second member have first elongated side portions disposed in contact with each other and in crossed relationship with each other, and said second member has a second elongated side portion opposite said first side portion thereof, and said third member has a first elongated side portion disposed in contact with said second side portion and in a crossed relationship therewith.

2. A polypod structure as claimed in claim 1, in which said crossed relationships of said side portions are disposed centrally of said pillar-shaped members.

3. A polypod structure as claimed in claim 1, in which said pillar-shaped members are integrally joined together with said crossed relationship at parts thereof other than the middle parts thereof.

4. A polypod structure as claimed in claim 1, in which all of said pillar-shaped members are substantially of the same dimensions and shape.

5. A polypod structure as claimed in claim 4, in which each of said pillar-shaped members has a substantially rectangular cross section in a plane perpendicular to the longitudinal direction thereof.

6. A polypod structure as claimed in claim 1, in which said structural means has a shape and dimensions such that a plurality thereof can be combined in interlocked state to form an assembled structure not readily disassembled by external forces.

7. A polypod structure as claimed in claim 6, in which said structural means has a shape and dimensions such that a plurality thereof can be thus combined in accordance with various modes of mutual engagement whereby the perviousness of the assembled structure to flow of fluid matter therethrough can be selectively adjusted.

8. A polypod structure as claimed in claim 1, in which said pillar-shaped members are made of concrete.

References Cited

UNITED STATES PATENTS

| | | | |
|---|---|---|---|
| 2,909,037 | 10/1959 | Palmer | 61—4 |
| 3,176,468 | 4/1965 | Nagai et al. | 61—4 |
| 3,380,253 | 4/1968 | Vita | 61—3 |

FOREIGN PATENTS

| | | | |
|---|---|---|---|
| 1,137,391 | 12/1968 | Great Britain | 61—4 |

PETER M. CAUN, Primary Examiner

U.S. Cl. X.R.

61—4, 37